UNITED STATES PATENT OFFICE.

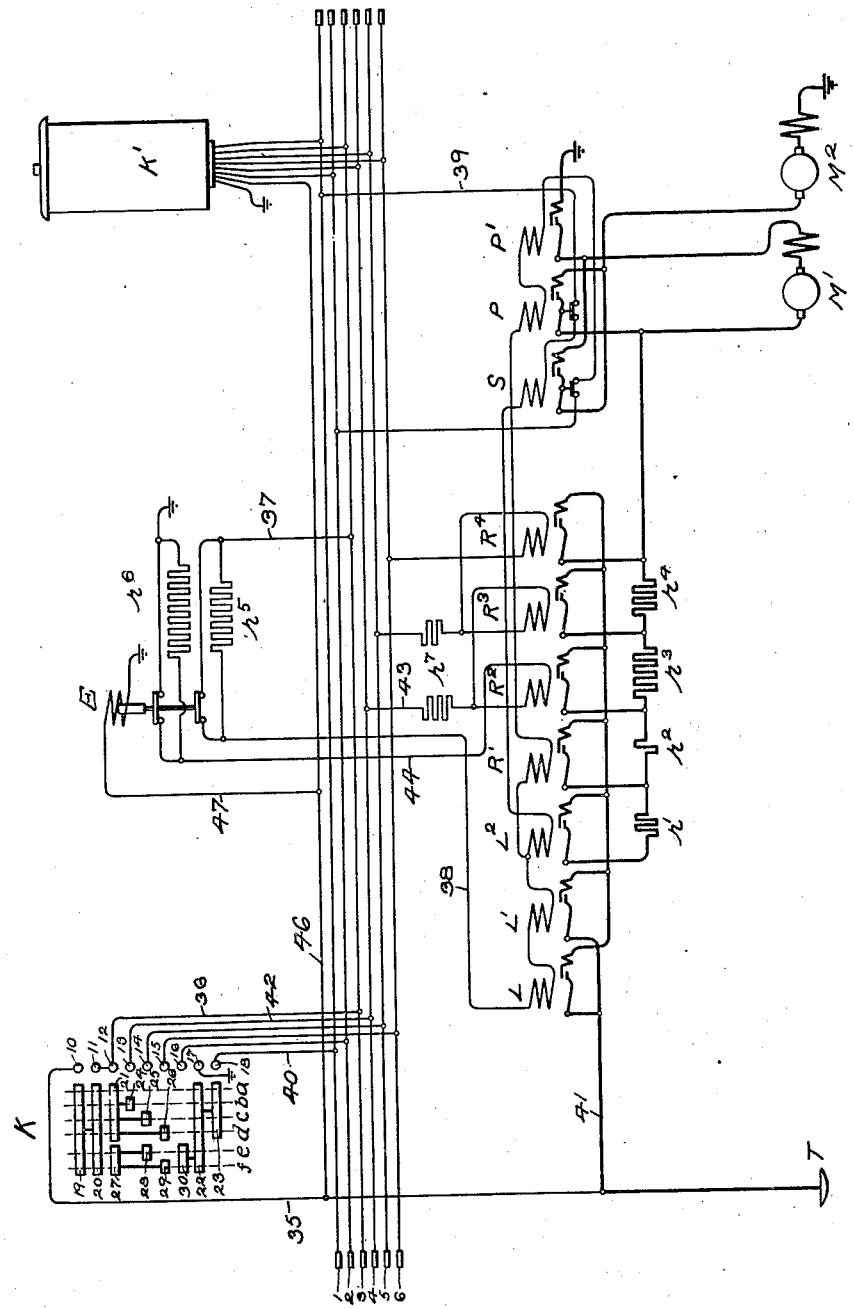

GEORGE H. HILL, OF SCHENECTADY, NEW YORK, ASSIGNOR TO GENERAL ELECTRIC COMPANY, A CORPORATION OF NEW YORK.

SYSTEM OF MOTOR CONTROL.

No. 908,408.    Specification of Letters Patent.    Patented Dec. 29, 1908.

Application filed August 23, 1907. Serial No. 389,777.

*To all whom it may concern:*

Be it known that I, GEORGE H. HILL, a citizen of the United States, residing at Schenectady, county of Schenectady, State of New York, have invented certain new and useful Improvements in Systems of Motor Control, of which the following is a specification.

My invention relates to systems of control for motors, and particularly to systems employing controllers of the separately actuated type. Such systems of control are well known and comprise a plurality of electromagnetically or electro-pneumatically operated switches or contactors which are controlled by a master-switch and serve to connect the motor or motors to be controlled to the source of current supply, while also regulating the speed thereof by varying the amount of resistance in the motor circuits and by connecting the motors in series or parallel. In this connection a reversing switch, operated from the master-switch, is also generally used. Such systems of control are now employed extensively in the operation of electric cars and trains, and it is in this service that my invention is especially useful.

In train control systems, of the above described type where the current for the actuating controller is derived from the same source as that which feeds the motors, or in other words, from the trolley or third rail, variations in voltage on the line, if great, may interfere with the operation of the contactors and render their action uncertain.

It is an object of my invention to prevent variations in voltage on the line from influencing the current in the control circuits to such an extent as to interfere with the operation of the contactors.

The drawing illustrates diagrammatically a simple system of motor control, with my invention applied thereto. The system shown is adapted for the control of the motors on a car of an electric train intended for multiple unit operation. The usual reversing switch, cut-out switches and other auxiliary devices are omitted for the sake of clearness as they form no part of my invention.

Referring to the drawing, $M^1$ and $M^2$ are the motors to be controlled. A controller of the separately actuated contact type is shown as made up of contactors L, $L^1$, $L^2$, S, P, $P^1$, $R^1$, $R^2$, $R^3$ and $R^4$, the operation of which is controlled from either of the master-switches K or $K^1$, located at either end of the car. Current both for the motors and for the control circuits is derived from the trolley or the third rail shoe T and the return circuits are through the rails or ground. Train wires 1 to 6 connect the master-switches with the controllers on all the cars in the usual manner. The master-switch K is shown in developed form and comprises fixed contact members 10 to 18, which engage with suitable segments 19 to 30 on the drum of the master-switch. The rotation of the drum of the master-switch and the successive engagement of the segments 19 to 30 with the fixed contacts 10 to 18 actuates the contactors and causes them to connect the motors first in series and with all the resistances in circuit, thereafter to cut out the resistance step-by-step, then to connect the motors in parallel with one another and part of the resistance in series therewith, and finally to cut out this resistance step-by-step leaving the motors connected in parallel across the line. In the first position $a$ of the master-switch K, certain of the control circuits are energized as follows: Current from the trolley T passes through wire 35 to the contact 10 of the master-switch K, then to the segments 19 and 20, contacts 11 and 12, through wire 36 to train wire 3, wire 37, thence either through the resistance $r^5$ or the lower contacts of the relay E (hereinafter described), to wire 38, actuating coils of contactors L, $L^1$, $L^2$ and S, interlocks on the contactor P, wire 39 to train wire $l$, thence through wire 40, contact 18, segments 23 and 22, and contact 17 to ground. The main motor circuit may now be traced from the trolley T, through wire 41, switches L, $L^1$, and $L^2$, resistances $r^1$, $r^2$, $r^3$ and $r^4$, motor $M^1$, switch S and through motor $M^2$ to ground. The motors are, therefore, connected in series with all the resistances in circuit. The movement of the master-switch to its second position $b$, in addition to the connections made on the first step, brings fixed contact 13 into engagement with the segment 24, whereupon current flows through the wire 42 to train wire 4, wire 43, resistance $r^7$, actuating coil of contactor $R^2$, wire 44, through either the resistance $r^6$ or the upper contacts of the relay E (hereinafter described), to ground. The energizing of this circuit causes the operation of the contactor $R^2$ which short-circuits the resistances $r^1$ and $r^2$ and leaves the motors connected in series with only the resistances $r^3$ and $r^4$ in circuit. Further rotation of the master-switch results in successively short circuiting resistances $r^3$ and $r^4$, connecting the motors in parallel with one another and in series with resistance $r^4$, and finally in cutting out this resistance and leaving the motors in parallel across the line. This operation will be understood by those familiar with this art without a more specific description.

The relay E is connected by means of the wires 46 and 47 directly across from trolley to ground. It is so designed that it will pull up when the voltage applied to it, exceeds a certain amount, and will drop if the voltage falls very much below this amount. When, therefore, the voltage on the line is above this value, the relay E will be held up and the resistances $r^5$ and $r^6$ will be in the control circuits. If, however, the voltage on the line falls very much below the amount at which the relay pulls up, the relay will drop and its contacts will short circuit the resistances $r^5$ and $r^6$. In this way the resistance of the control circuits is increased when the voltage on the line is high and decreased when the voltage is low, thereby preventing too great fluctuations in the currents through the actuating coils of the contactors. By having the voltage at which the relay E will drop somewhat below, (say 25 volts), the voltage at which it pulls up the relay is prevented from "fluttering" if the voltage of the line should happen to vary only slightly above and below the voltage at which the relay E operates.

While I have shown my invention as applied to but one system of motor control, I wish to state that I realize that it may be used in connection with many other systems, and desire to have it understood that I do not intend to limit myself to the particular arrangement I have described.

What I claim as new and desire to secure by Letters Patent of the United States, is:

1. In combination, a variable voltage source of current, an electrically actuated controller, a circuit connecting said controller and said source, a resistance, and means for cutting said resistance into and out of said circuit as the voltage at the source exceeds or is less than a certain amount.

2. In combination, a variable voltage source of current, an electrically actuated controller, a circuit connecting said controller and said source, a resistance and a relay for cutting said resistance into and out of said circuit as the voltage at the source exceeds or is less than a certain amount.

3. In combination, a variable voltage source of current, an electrically actuated controller, a circuit connecting said controller and said source, a resistance in said circuit, and a relay arranged to short circuit said resistance when the voltage at said source falls below a certain amount.

4. In combination, a variable voltage source of current, an electrically actuated controller, a circuit connecting said controller and said source, a resistance and a relay having its actuating coil connected across the source of current for cutting said resistance into or out of said circuit as the voltage at the source rises or falls.

5. In combination, a variable voltage source of current, an electrically actuated controller, a control circuit connecting said controller and said source and a master-switch therein for regulating the operation of said controller, a resistance and a relay having its actuating coil connected across the source of current and arranged to cut said resistance into or out of said control circuit as the voltage at the source exceeds or is less than a certain amount.

6. In a system of train control, a variable voltage source of current, motors to be controlled, a plurality of electro-magnetically actuated switches for connecting said motors to the source of current and regulating the speed thereof, a master switch, a control circuit from said source of current to said master switch and therefrom to the electro-magnetically actuated switches, a resistance, and a relay having its actuating coil connected across the source of current for cutting said resistance into or out of said control circuit as the voltage at the source exceeds or is less than a certain amount.

In witness whereof, I have hereunto set my hand this 22nd day of August, 1907.

GEORGE H. HILL.

Witnesses:
HELEN ORFORD,
ARBA B. MARVIN, Jr.